Nov. 11, 1924.

C. JENKINS 1,515,049

CUTTER AND FEEDER FOR POTATO PLANTERS

Filed Dec. 31 1923

WITNESSES

Charles Jenkins
INVENTOR

BY

ATTORNEY

Nov. 11, 1924.
C. JENKINS
1,515,049
CUTTER AND FEEDER FOR POTATO PLANTERS
Filed Dec. 31, 1923     2 Sheets-Sheet 2
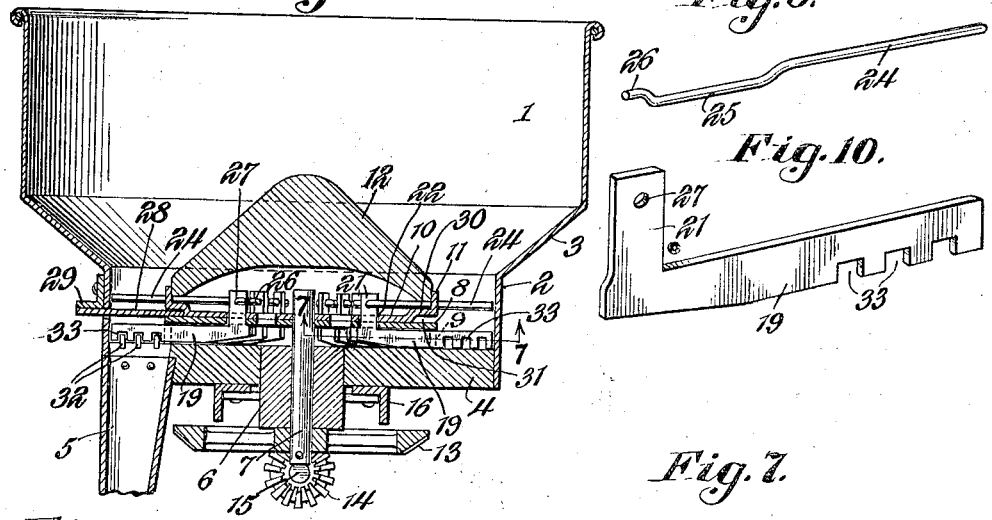
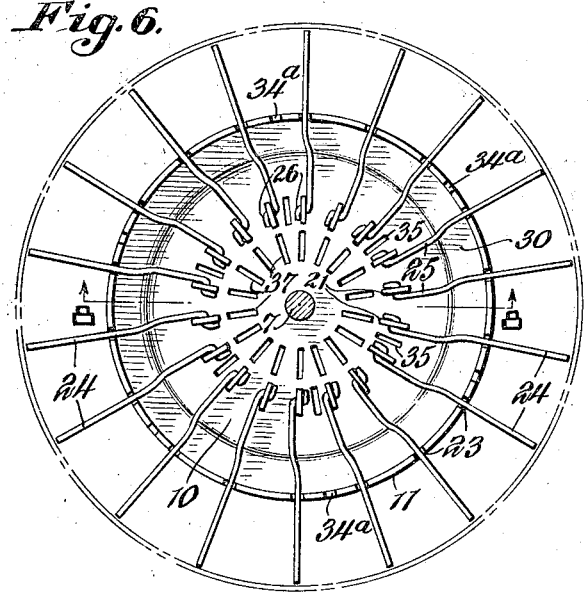
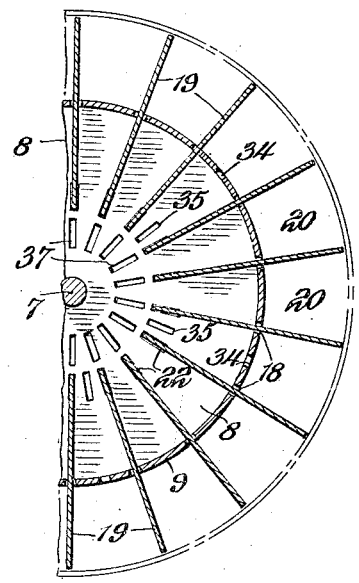
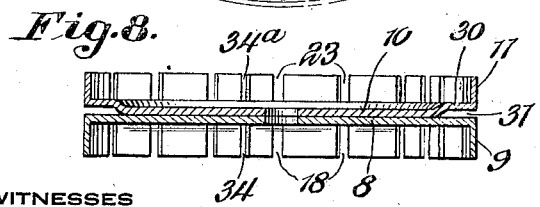
Charles Jenkins
INVENTOR
BY
ATTORNEY
WITNESSES
Louis Goodman
E. N. Lovewell Patented Nov. 11, 1924.

1,515,049

UNITED STATES PATENT OFFICE.

CHARLES JENKINS, OF DELEVAN, NEW YORK.

CUTTER AND FEEDER FOR POTATO PLANTERS.

Application filed December 31, 1923. Serial No. 683,783.

*To all whom it may concern:*

Be it known that I, CHARLES JENKINS, a citizen of the United States, residing at Delevan, in the county of Cattaraugus and State of New York, have invented new and useful Cutters and Feeders for Potato Planters, of which the following is a specification.

This invention relates to a cutter and feeder which is adapted to rotate within the hopper of a planter, and to automatically cut the potatoes into pieces of the desired size, and discharge the same into the drill tube.

The general object of the invention is to provide a device of this kind, which is of simple and practical construction, which may be economically manufactured and easily assembled and in which the blades forming radial partitions between the feed pockets of the rotatable member may be easily replaced by others of different number and size, so as to vary either the circumferential or radial dimensions of the pockets, or both of them as may be desired.

The invention consists further in various structural details and combinations thereof, which will be more fully described in connection with the accompaying drawings illustrating the preferred form of the invention.

In the drawings:

Figure 5 is a vertical diametric sectional view of the invention.

Figure 6 is a plan view of the feeder.

Figure 7 is a horizontal section on the line 7—7 of Figure 5, looking upward.

Figure 8 is a sectional view of the feed disks taken on the line 8—8 of Figure 6.

Figure 9 is a detail perspective view of one of the feed fingers.

Figure 10 is a detail perspective view of one of the feed blades.

Figure 1:
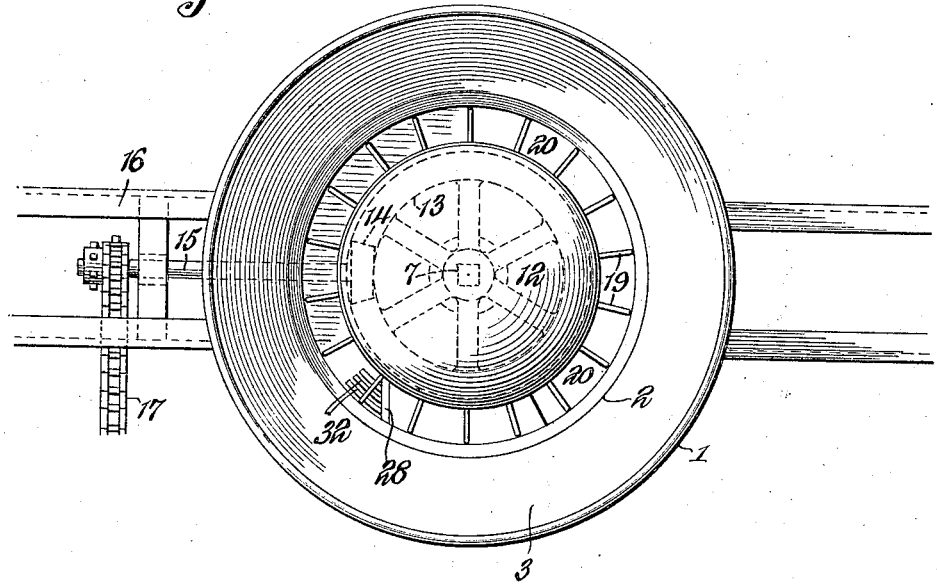
Figure 1 is a plan view of the invention.
Figure 2:
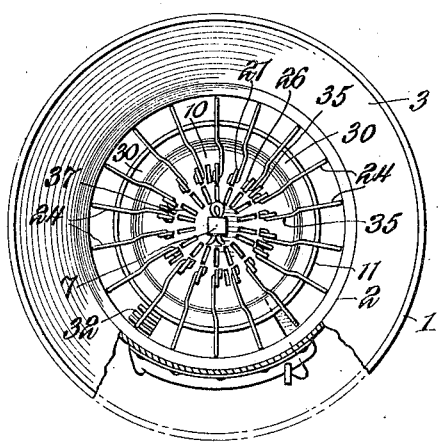
Figure 2 is a plan view of the hopper and feeder, with the central member of the hopper removed, and a portion of the hopper rim broken away in order to better illustrate the invention.
Figure 3:
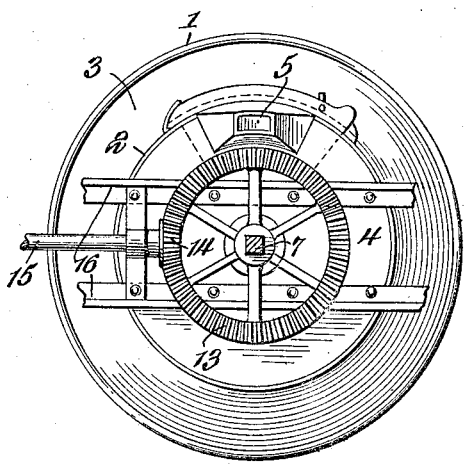
Figure 3 is a bottom plan view of the invention.

The planter, of which my invention forms a part, includes a cylindrical hopper 1 having a lower cylindrical portion 2 of less diameter than the upper portion, and connected therewith by an intermediate inclined portion 3. The lower portion 2 is provided with a bottom 4, having an outlet opening at one side from which leads a drill tube 5. The bottom 4 is provided centrally with a vertical bearing member 6, in which is journaled a vertical shaft 7, having secured to its upper end a circular disk 8 with a downturned peripheral flange 9, which rests on the bottom 4 of the hopper. A second disk 10 is secured adjacent the disk 8, and is provided with an upturned peripheral flange 11, opposed to the flange 9. A crowned member 12 rests within the flange 11, and its sloping surface cooperates with the sloping surface of the portion 3 to direct the potatoes into the annular space between the reduced lower portion 2 of the hopper and the flanges 9 and 11.

The shaft 7 has a beveled gear 13 secured to its lower end, which meshes with a driving pinion 14 secured to the inner end of the horizontal shaft 15, supported for rotation in the frame 16 of the planter and driven by any suitable means, such as the sprocket gear shown at 17.

The flange 9 is divided into a plurality of segments of equal lengths by a series of slots 18, through which project an equal number of radial feed blades 19, thus dividing the annular space within the reduced portion 2 of the hopper, as shown in Figure 7, into a series of equal pockets 20. The inner end of each blade 19 has an upstanding tail 21, which projects upwardly through slots 22 formed in the disks 8 and 10. A series of slots 23 are formed in the flange 11, in the same vertical planes with the slots 18, and receive radial feed fingers 24. The inner end of each of these feed fingers is offset, as at 25, and terminates with a lateral hook-shaped end 26, which is adapted to be inserted through an eye 27 in the tail 21 of the corresponding blade 19, and constitute a means for locking the blade in position. The fingers 24 in addition to locking the blades 19 in position, cooperate therewith to form an upward extension of the partitions between the pockets 20. As the potatoes are carried around in these pockets, they are presented to the cutting edge of the horizontal knife blade 28, which is secured to a flange 29 on the outside of the hopper, and projects inwardly across the annular space within the reduced portion 2 of the hopper and above the opening leading into the drill tube 5. The outer portion of the disk 10 is offset upwardly, as shown at 30, in Figures 5 and 8, so as to form an annular channel 31, which receives the inner end of the cutting blade 28.

As the feeder rotates with the shaft 7, it will be understood that the potatoes within the respective pockets 20 are carried around in the annular space within the reduced portion 2, and forced against the cutting blade 28 by the successive blades 19, which pass beneath the cutting blade, and the fingers 24 which pass above the cutting blade. The size of the pieces which are cut from the potatoes is determined primarily by the distance between the blade 28, and the bottom of the annular channel. For the purpose of adjusting the device to cut pieces of different size, however, a plurality of arcuate slots may be formed in the bottom of the annular channel in advance of the cutting blade 28, for removably receiving a similar number of arcuate ribs 32, thus raising the potatoes before they are presented to the cutting blade, so that the size of the pieces cut off will depend upon the vertical thickness of the ribs 32. The blades 19 are provided with corresponding slots 33 for permitting said blades to pass over the ribs, as the feeder rotates.

The distance between the lower portion 2 of the hopper and the flanges 9 and 11 is preferably about three inches, and the distance between the successive slots 18 is about two inches. Means, however, are provided for adjusting the dimensions of the pockets 20. For this purpose, as shown in Figure 7, I have provided an additional slot 34 in the rim 9, midway between every third slot 18 and the succeeding slot 18, so that by inserting a blade 19 through the slot 34 and removing the two blades in the adjacent slots 18, the circumferential dimensions of the pockets may be increased by one-half. Slots 34ᵃ are also formed in the flange 11, corresponding to the slots 34 in the flange 9. Likewise, slots 35 are formed in disks 9 and 11, corresponding to the slots 34 and 34ᵃ.

Figure 4:
Figure 4 is a vertical radial section through a portion of the hopper and feed mechanism, and showing the diameter reduced.
Figure 4:
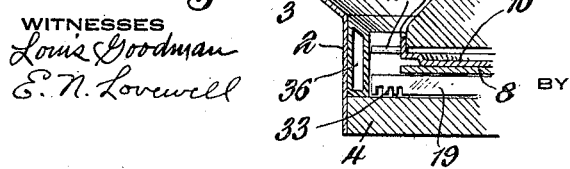

For reducing the radial dimensions of the pockets, a ring 36 may be inserted within the lower portion 2 of the hopper, as shown in Figure 4, and when this is done, the blades 19 are drawn inwardly and the tails 21 inserted through slots 37 formed in the disks 9 and 11, in the same radial planes as the slots 22, but inwardly thereof. The blades 19 may be easily changed, simply by removing the crowned central portion 12 of the hopper, which permits the fingers 24 to be lifted out of the slots 23 or 34ᵃ, and detached from the eyes 27.

From the foregoing description, it will be seen that I have devised a simple and practical device for the purpose described, which may be manufactured at a moderate cost, easily assembled, and quickly adjusted to vary the dimensions of the feed pockets, as well as the size of the pieces to be cut. Although I have described in detail the specific construction of the invention in the form shown in the drawings, it is to be understood that this is merely for the purpose of illustration, and that various modifications may be made in the form, size, proportion and general arrangement of the parts within the scope of what is claimed, without any material departure from the salient features of the invention.

What is claimed is:

1. In a device of the class described, the combination of a hopper, a rotatable feeder having a plurality of radial blades forming pockets of equal width between them, and means whereby the number and relative positions of said blades may be changed for adjusting the distances between them so as to form uniform pockets of a different width.

2. In a device of the class described, the combination of a hopper having a cylindrical lower portion, a rotatable feed member concentric therewith but of smaller diameter thus leaving an annular space within the wall of the hopper, a plurality of removable blades carried by the feed member and extending across said annular space and dividing it into equal pockets, and means for adjusting said blades circumferentially and radially.

3. In a device of the class described, a rotatable feed member having peripheral cylindrical flange portions concentric with the axis of rotation and provided with series of slots arranged in pairs, each pair being in the same vertical plane, a blade projecting radially through the lower slot of each pair and having at its inner end an upwardly projecting tail, a finger projecting radially through the upper slot and secured at its inner end to the tail of the corresponding blade, and means for securing said fingers and blades against radial movement.

4. In a device of the class described, a rotatable feed member having peripheral flange portions concentric with the axis of rotation and provided with series of slots arranged in pairs, each pair being in the same vertical plane, a blade projecting radially through the lower slot in each pair and having at its inner end an upwardly projecting tail, a finger projecting radially through the upper slot and removably secured at its inner end to the tail of the corresponding blade, a central member resting on said fingers within the flange portion of the feed member and covering the inner ends of the fingers, and means engaging the tail of each blade for preventing radial movement of the fingers and blades.

5. In a device of the class described, the combination of a hopper having an outlet in its bottom at one side thereof, a knife above said outlet, a rotatable feeder comprising a circular member, two series of equally spaced radially projecting elements secured to the circular member, one series arranged to rotate above the knife and the other series below the knife, each element of one series being in the same vertical plane with a corresponding element of the other series and secured thereto, and means for adjusting the respective elements circumferentially to form spaces of different widths.

6. In a device of the class described, the combination of a hopper having an outlet in its bottom, a knife above said outlet, a rotatable feeder within the hopper comprising a horizontal circular member, two series of equally spaced radially projecting elements secured to the circular member, one series arranged to rotate above the knife and the other series below the knife, each element of one series being in the same vertical plane with a corresponding element of the other series and secured thereto, means for adjusting the respective elements circumferentially and radially, and means engageable with one element of each series to secure said elements in their adjusted positions.

7. In a device of the class described, a rotatable feeder comprising a rotatable circular member having a peripheral flange portion, a circular series of radial slots in the circular member within the flange portion, slots in the upper and lower edges of the flange portion in the same vertical planes as said radial slots, spaced radial elements arranged in pairs, each pair being secured together and secured in respective slots.

8. In a device of the class described, a rotatable feeder comprising a circular member having a peripheral flange portion, a circular series of radial slots in the circular member within the flange portion and concentric therewith, slots in the upper and lower edges of the flange portion in the same vertical planes as said radial slots, blades in the lower slots having tails in their inner ends extending up through the radial slots, and fingers in the upper slots secured at their inner ends to the tails of the blades.

9. In a device of the class described, a rotatable feed member having peripheral flange portions concentric with the axis of rotation and provided with series of slots arranged in pairs, each pair being in the same vertical plane, a blade projecting radially through the lower slot in each pair and having at its inner end an upwardly projecting tail, a finger projecting radially through the upper slot and removably secured at its inner end to the tail of the corresponding blade, and means engaging the tail of each blade for preventing radial movement of the fingers and blades.

10. In a device of the class described, the combination of a hopper having an outlet in its bottom at one side thereof, a knife above said outlet, a rotatable feeder comprising a circular member, two series of equally spaced radially projecting elements secured to the circular member, one series arranged to rotate above the knife and the other series below the knife, and means for adjusting the respective elements circumferentially to form spaces of different widths.

11. In a device of the class described, the combination of a hopper having an outlet in its bottom, a knife above said outlet, a rotatable feeder within the hopper, comprising a horizontal circular member, two series of equally spaced radially projecting elements secured to the circular member, one series arranged to rotate above the knife and the other series below the knife, means for adjusting the respective elements circumferentially and radially, and means engageable with one element of each series to secure said elements in their adjusted positions.

In testimony that I claim the foregoing as my own, I have hereto affixed my signature.

CHARLES JENKINS.